March 29, 1949. W. F. ECKERT 2,465,436
EXPLOSION-PROOF GENERATOR
Filed April 12, 1945
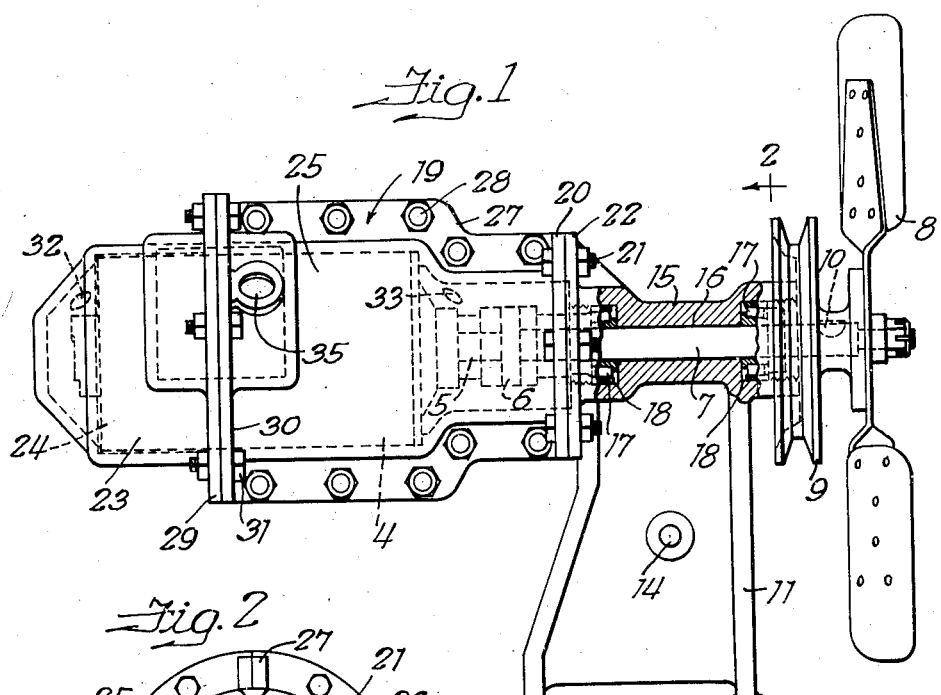
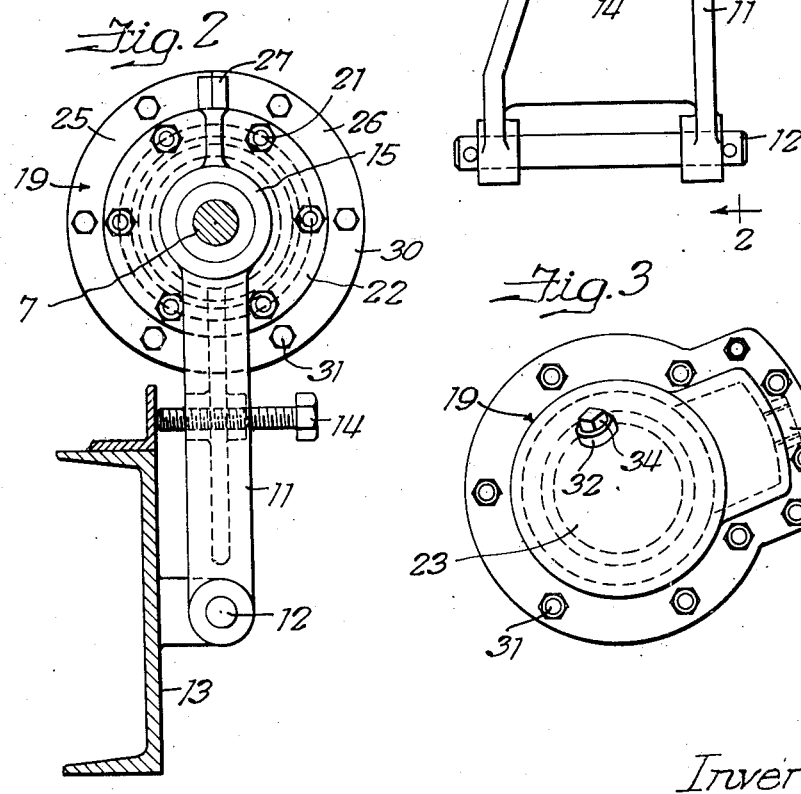
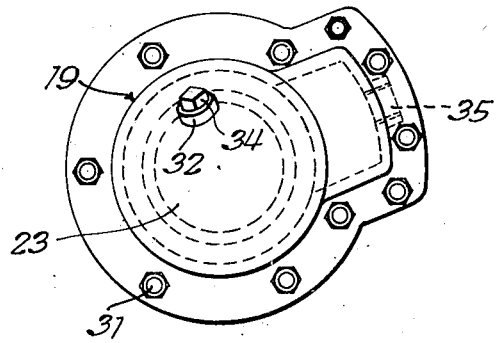
Inventor
William F. Eckert Patented Mar. 29, 1949

2,465,436

UNITED STATES PATENT OFFICE 2,465,436

EXPLOSION-PROOF GENERATOR

William F. Eckert, Rochelle, Ill.

Application April 12, 1945, Serial No. 588,004

12 Claims. (Cl. 171—252)

This invention relates to a new and improved explosion-proof generator, especially designed and adapted for use on trucks and other motor vehicles such as have been used in the transportation of gasoline, ammunition and material generally in landing operations during the present war, although, it will, of course, be self-evident that this explosion-proof generator may be used wherever the safety features incorporated may be important or desirable.

The principal object of my invention is to provide a generator encased in an air-tight housing and mounted on a support through which its drive shaft extends for support in roller bearings, the air-tight housing having air-tight connection with the support and the support having an elongated bore through which the drive shaft extends with minimum operating clearance so that if any mixture finds its way into the air-tight housing and is ignited by sparks from the generator brushes the burning gases will have ample opportunity in their slow passage through the restricted bore to cool off and thus avoid danger of causing a serious explosion wherever the generator happens to be used.

The invention is illustrated in the accompanying drawing, in which—

Fig. 1 is a side view of an explosion-proof generator assembly made in accordance with my invention and illustrating in section the elongated restricted bore for the drive shaft;

Fig. 2 is a section on the line 2—2 of Fig. 1, and

Fig. 3 is an end view of the other end of the air-tight housing for the generator.

The same reference numerals are applied to corresponding parts throughout these views.

The generator is shown in dotted lines at 4 in Fig. 1 and has its armature shaft 5 connected by means of a coupling 6 to the drive shaft 7. The fan 8 and pulley 9 are keyed as indicated at 10 on the outer end of the drive shaft 7. The bracket 11 for supporting the generator and its drive pulley and fan is pivoted as indicated at 12 on a suitable support 13 and has an adjusting screw 14 thereon for take-up of slack in the drive belt that extends over the pulley 9. The upper end 15 of the bracket has an elongated restricted bore 16 through which the drive shaft 7 extends with about .005 inch clearance around it, the shaft being received in roller bearings 17 in the enlarged ends 18 of the bore, the e bearings serving to keep the shaft 7 accurately centered with respect to the restricted bore 16.

Now, the generator 4 is encased inside an air-tight housing indicated generally by the reference numeral 19 which has its flanged end 20 bolted as indicated at 21 onto the flange 22 provided on the upper end of the bracket 11 in concentric relation to the bore 16, so that the inner end of the bore 16 is in open communication with the inside of the housing 19. If an explosive mixture should find its way into the housing 19 and be ignited by sparks from the generator brushes there is no danger of this causing a serious explosion where the generator may be in close proximity to containers of gasoline and munitions as, for example, in the case of motor vehicles used in landing operations in the present war, because the gases under pressure in the housing 19 can find their way out through the bore 16 only very slowly and these gases in their slow passage through the bore 16 will have a sufficient opportunity to cool off.

The air-tight housing 19 may be constructed in any suitable or preferred manner but is herein shown as made in three parts, namely, an end cap 23 which surrounds the brush housing end portion 24 of the generator and two generally semi-cylindrical body parts 25 and 26 which, together, serve to enclose the balance of the generator and its drive coupling 6. The parts 25 and 26 have longitudinally extending flanges 27 which are arranged to be bolted together as indicated at 28 more or less tightly enclosing the generator housing so as to provide good support therefor when the housing 19 is bolted to the bracket 11. The cap 23 has an annular flange 29 which is bolted to the annular flanges 30 on the parts 25 and 26 as indicated at 31. All of the flanges fit together closely enough and the bolts are tightened enough to avoid any likelihood of hot gases escaping directly from the housing 19. Holes are indicated at 32 and 33 which are in the immediate vicinity of the oil cups on the opposite ends of the housing of the generator 4 so as to permit insertion of the nozzle of an oil can when the plugs 34 threaded into these holes are removed. If the generator brushes require attention the cap 23 can be readily removed without disturbing the rest of the explosion-proof generator assembly. The generator leads are extended through suitable packing in an explosion-proof elbow fitting (not shown) which is threaded in the hole 35.

It is believed the foregoing description conveys a good understanding of the objects and advantages of my invention. The appended claims have been drawn to cover all legitimate modifications and adaptations.

I claim:

1. An explosion-proof generator and mounting, comprising, in combination, an electrical generator having an armature, a support having an elongated relatively small bore provided with enlarged ends containing anti-friction bearings which are disposed in substantially concentric relation to said bore and armature, a generator drive shaft extending through said bore with small operating clearance in the order of a few thousandths of an inch and supported in said bearings and drivingly connected to said armature, and an air-tight, explosion resisting housing enclosing and rigidly supporting said generator and rigidly secured to said support with an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

2. An explosion-proof generator and mounting comprising, in combination, an electrical generator having an armature shaft extending therefrom, a support having an elongated relatively small bore provided with enlarged ends containing anti-friction bearings which are disposed in substantially concentric relation to said bore and armature shaft, a generator drive shaft extending through said bore with small operating clearance in the order of a few thousandths of an inch and supported in said bearings, a coupling flexibly connecting said shafts, and an air-tight explosion resisting housing enclosing said generator and coupling and rigidly supporting said generator for limited sliding movement endwise under pressure produced in the event of an explosion in either end of said housing and rigidly bolted to said support so as to provide an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

3. In combination, a fan pulley bracket mounted on a support and having in its free end portion an elongated restricted bore and anti-friction bearings supported at opposite ends of said bore in substantially concentric relation thereto, a fan and pulley, a shaft driven by said pulley extending through said bore with only slight operating clearance in the order of a few thousandths of an inch and supported in said bearings, an electrical generator the armature of which is connected to and driven by said shaft, and an air-tight, explosion resisting housing enclosing and rigidly supporting said generator and rigidly secured to and supported on said bracket with an air-tight, explosion resisting connection, the aforesaid bore being open at one end of the atmosphere and being of sufficient length to cause cooling off of hot gases discharged therethrough in the event of an explosion occurring in said housing which communicates with the other end of the bore.

4. In combination, a fan pulley bracket mounted on a support and having in its free end portion an elongated restricted bore and anti-friction bearings supported at opposite ends of said bore in substantially concentric relation thereto, a fan and pulley, a shaft driven by said pulley extending through said bore with only slight operating clearance in the order of a few thousandths of an inch and supported in said bearings, an electrical generator having an armature shaft extending therefrom, a coupling flexibly connecting said shafts, and an air-tight, explosion resisting housing enclosing said generator and coupling and rigidly supporting said generator for limited sliding movement endwise under pressure produced in the event of an explosion in either end of said housing and rigidly secured to and supported on said bracket with an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

5. An explosion-proof generator and mounting comprising, in combination, an electrical generator having an armature, a support having an elongated relatively small bore, a generator drive shaft extending through said bore with small operating clearance in the order of a few thousandths of an inch and drivingly connected to said armature, and an air-tight, explosion resisting housing enclosing and rigidly supporting said generator and rigidly secured to said support with an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

6. An explosion-proof generator and mounting comprising, in combination, an electrical generator having an armature shaft extending therefrom, a support having an elongated relatively small bore, a generator drive shaft extending through said bore with small operating clearance in the order of a few thousandths of an inch, a coupling flexibly connecting said shafts, and an air-tight explosion resisting housing enclosing said generator and coupling and rigidly supporting said generator for limited sliding movement endwise under pressure produced in the event of an explosion in either end of said housing and rigidly bolted to said support so as to provide an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

7. In combination, a fan pulley bracket mounted on a support and having in its free end portion an elongated restricted bore, a fan and pulley, a shaft driven by said pulley extending through said bore with only slight operating clearance in the order of a few thousandths of an inch, an electrical generator the armature of which is connected to and driven by said shaft, and an air-tight, explosion resisting housing enclosing and rigidly supporting said generator and rigidly secured to and supported on said bracket with an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

8. In combination, a fan pulley bracket mounted on a support and having in its free end portion an elongated restricted bore, a fan and pulley, a shaft driven by said pulley extending through said bore with only slight operating clearance in the order of a few thousandths of an inch, an electrical generator having an armature shaft extending therefrom, a coupling flexibly connecting said shafts, and an air-tight, explosion resisting housing enclosing said generator and coupling and rigidly supporting said generator for limited sliding movement endwise under pressure produced in the event of an explosion in either end of said housing and rigidly secured to and supported on said bracket with an air-tight, explosion resisting connection, the aforesaid bore being open at one end to the atmosphere and being of sufficient length to cause cooling off of hot gases discharged therethrough in the event of an explosion occurring in said housing which communicates with the other end of the bore.

9. In combination, a fan pulley bracket mounted on a support and having in its free end portion an elongated restricted bore and anti-friction bearings supported at opposite ends of said bore in substantially concentric relation thereto, a fan and pulley, a shaft driven by said pulley extending through said bore with only slight operating clearance in the order of a few thousandths of an inch and supported in said bearings, an electrical generator the armature of which is connected to and driven by said shaft, said bracket having a supporting flange thereon at one end of said bore extending annularly relative to said bore, and an air-tight, explosion resisting housing having one end bolted to said flange, said housing enclosing and rigidly supporting said generator therein, the aforesaid bore being open at one end to the atmosphere and being of sufficient length to cause cooling off of hot gases discharged therethrough in the event of an explosion occurring in said housing which communicates with the other end of the bore.

10. In combination, a fan pulley bracket mounted on a support and having in its free end portion an elongated restricted bore, a fan and pulley, a shaft driven by said pulley extending through said bore with only slight operating clearance in the order of a few thousandths of an inch, an electrical generator the armature of which is connected to and driven by said shaft, said bracket having a supporting flange thereon at one end of said bore extending annularly relative to said bore, and an air-tight, explosion resisting housing having one end bolted to said flange, said housing enclosing and rigidly supporting said generator therein, the aforesaid bore being open at one end to the atmosphere and being of sufficient length to cause cooling off of hot gases discharged therethrough in the event of an explosion occurring in said housing which communicates with the other end of the bore.

11. In combination with an electrical generator having a generally cylindrical housing and having an armature shaft extending from one end thereof for drive connections, an air-tight, explosion resisting housing of sectional construction to enclose and rigidly support said generator on a support, said housing comprising a cap section for enclosing the outer end of said generator housing, said cap having an annular flange thereon, and two semi-circular sections for enclosing and clamping therebetween the rest of said generator housing, the latter sections having longitudinally extending flanges which are arranged to be bolted in abutting air-tight relation clamping the generator housing between said sections and annular flanges at both ends, the annular flanges at one end being arranged to be bolted in abutting air-tight relation to the annular flange on said cap and the annular flanges at the other end being arranged to be bolted to a support in air-tight relation thereto, said cap section having an annular internal shoulder provided therein for abutting the adjacent end portion of the generator to limit endwise displacement of the generator relative to the air-tight housing in one direction in the event of an explosion in the other end of said housing.

12. In combination with an electrical generator having a generally cylindrical housing and having an armature shaft extending from one end thereof for drive connections, an air-tight, explosion resisting housing of sectional construction to enclose and rigidly support said generator on a support, said housing comprising a cap section for enclosing the outer end of said generator housing, said cap having an annular flange thereon, and two semi-circular sections for enclosing and clamping therebetween the rest of said generator housing, the latter sections having longitudinally extending flanges which are arranged to be bolted in abutting air-tight relation clamping the generator housing between said sections and annular flanges at both ends, the annular flanges at one end being arranged to be bolted in abutting air-tight relation to the annular flange on said cap and the annular flanges at the other end being arranged to be bolted to a support in air-tight relation thereto, the two semi-circular housing sections having an annular internal shoulder provided therein for abutting the adjacent end portion of the generator to limit endwise displacement of the generator relative to the air-tight housing in one direction in the event of an explosion in the other end of said housing.

WILLIAM F. ECKERT.

REFERENCES CITED

The following references are of record in the file of this patent:

UNITED STATES PATENTS

| Number | Name | Date |
| --- | --- | --- |
| 489,302 | Goolden | Jan. 3, 1893 |
| 692,690 | Miles | Feb. 4, 1902 |
| 1,304,229 | Wiard | May 20, 1919 |
| 1,601,571 | Knapp | Sept. 28, 1926 |
| 1,622,166 | Schultz | Mar. 22, 1927 |
| 1,990,279 | Schaffler-Glossl | Feb. 5, 1935 |
| 2,030,260 | Lewis | Feb. 11, 1936 |
| 2,198,863 | Corey | Apr. 30, 1940 |
| 2,306,608 | Hubacker | Dec. 29, 1942 |